(12) United States Patent
Hill

(10) Patent No.: US 6,254,488 B1
(45) Date of Patent: Jul. 3, 2001

(54) HYDROFORMED DRIVE SHAFT AND METHOD OF MAKING THE SAME

(75) Inventor: James D. Hill, Troy, MI (US)

(73) Assignee: Daimlerchrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/351,644

(22) Filed: Jul. 13, 1999

(51) Int. Cl.$^7$ ........................................ F16C 3/00
(52) U.S. Cl. ......................... 464/180; 464/183; 464/902
(58) Field of Search ................................. 403/220, 225, 403/228, 290; 464/179, 180, 182, 183, 185, 902

(56) References Cited

U.S. PATENT DOCUMENTS

| | | |
|---|---|---|
| 2,001,166 | 5/1935 | Swennes . |
| 2,269,799 | 1/1942 | Upson . |
| 2,380,952 | 8/1945 | Dewey . |
| 3,075,406 * | 1/1963 | Butler, Jr. et al. ................. 464/180 |
| 3,521,464 | 7/1970 | Kidby . |
| 3,553,978 | 1/1971 | Williams . |
| 3,659,434 | 5/1972 | Wolfe . |
| 4,238,540 * | 12/1980 | Yates et al. ............................. 428/36 |
| 4,272,971 * | 6/1981 | Loyd et al. ............................ 464/180 |
| 4,273,207 * | 6/1981 | Sivers et al. ......................... 180/70 P |
| 4,560,188 * | 12/1985 | Berti et al. ............................ 285/47 |
| 5,397,272 | 3/1995 | Smiley et al. . |
| 5,425,675 * | 6/1995 | Pfeifer ................................... 464/180 |
| 5,460,574 | 10/1995 | Hobaugh . |
| 5,566,721 * | 10/1996 | Breese ................................... 138/145 |
| 5,643,093 | 7/1997 | Breese . |
| 6,015,350 * | 1/2000 | Breese ................................... 464/162 |
| 6,023,830 * | 2/2000 | Cole et al. ......................... 29/407.01 |

\* cited by examiner

Primary Examiner—Lynne H. Browne
Assistant Examiner—Kenn Thompson
(74) Attorney, Agent, or Firm—Lawrence J. Shurupoff

(57) ABSTRACT

A tube-in-tube driveshaft has an inner tube extending coaxially within an outer tube. A dampening material such as polystyrene foam is injected into the space between the tubes to increase strength, and reduce noise, vibration and whipping. The driveshaft is made by placing the tube-in-tube assembly axially within a mold cavity, and injecting fluid into the inner tube under sufficient pressure to expand the inner tube to its final desired contour and the outer tube into pressure contact with the mold cavity. The expanded tube-in-tube assembly is then placed in a second mold cavity. Fluid is injected into the inner tube and also between the tubes under sufficient pressure to expand the outer tube into contact with the second mold cavity, thereby forming the outer tube to its final desired contour, while retaining the inner tube in its final desired contour. The tube ends are welded together and the dampening material is injected into the space between the tubes through holes in the inner tube.

6 Claims, 3 Drawing Sheets

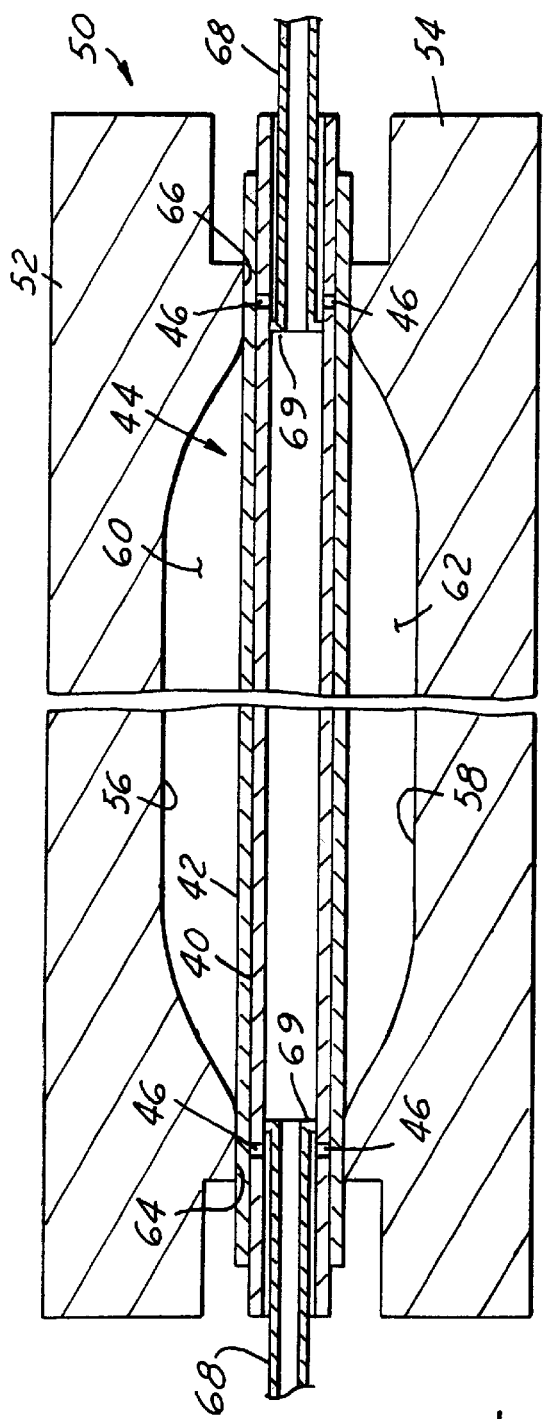
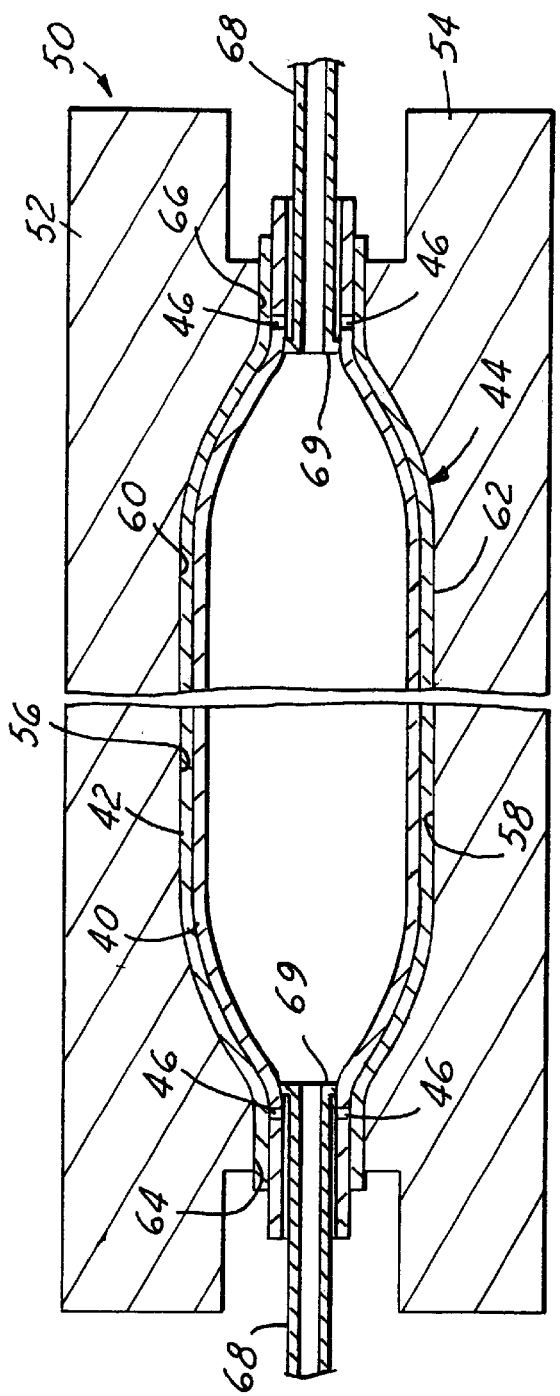
FIG. 4
FIG. 5

HYDROFORMED DRIVE SHAFT AND METHOD OF MAKING THE SAME

This invention relates generally to driveshafts for automotive vehicles and more particularly to a driveshaft made of two tubes, one within the other.

BACKGROUND AND SUMMARY OF THE INVENTION

When driveshafts exceed about 65 inches in length, they have a tendency to vibrate and whip at high speeds of rotation. The longer the driveshaft, the more likely it is to vibrate or whip at high speeds. To overcome this problem, long driveshafts have sometimes been made from two short driveshafts, aligned and connected with a bearing. However, this aligned two part construction is very expensive.

A driveshaft made of two tubes, one within the other, according to the tube-in-tube concept of this invention, is much stronger and can be rotated at higher speeds without vibrating or whipping. The space between the tubes is filled with a lightweight dampening material which increases strength and further reduces the tendency to vibrate. As a dampening material, a lightweight foam is recommended, preferably polystyrene. The dampening material could also be made of other materials such as rubber, but a lightweight polystyrene is preferred. Such material dampens both vibration and noise. The dampening material is preferably injected into the space between the tubes in liquid form and allowed to foam and set.

One object of this invention is to provide a driveshaft embodying the tube-in-tube concept, having the foregoing features and capabilities.

Another object is to provide a driveshaft which is rugged and durable in use, can be made in greater lengths and operated at higher speeds without vibrating or whipping, and is capable of being readily manufactured.

A further object is to provide a method of making the driveshaft of this invention.

These and other objects, features and advantages of the invention will become more apparent as the following description proceeds, especially when considered with the accompanying drawings.

BRIEF DESCRIPTION OF THE DRAWINGS

FIG. 4 is a longitudinal sectional view, with parts broken away, showing a tube-in-tube assembly in a mold prior to an initial step in the method of making the driveshaft of this invention.

FIG. 5 is a view similar to FIG. 4 showing the partially formed tube-in-tube assembly after completion of the initial step in the method.

DETAILED DESCRIPTION OF THE PREFERRED EMBODIMENTS

Figure 1:
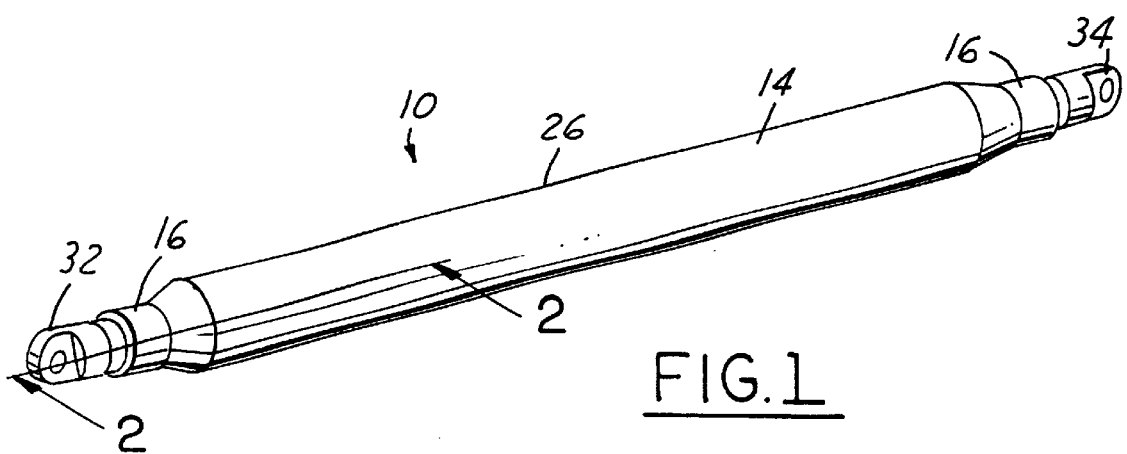
FIG. 1 is a perspective view of an automotive driveshaft constructed in accordance with this invention.
Figure 2:
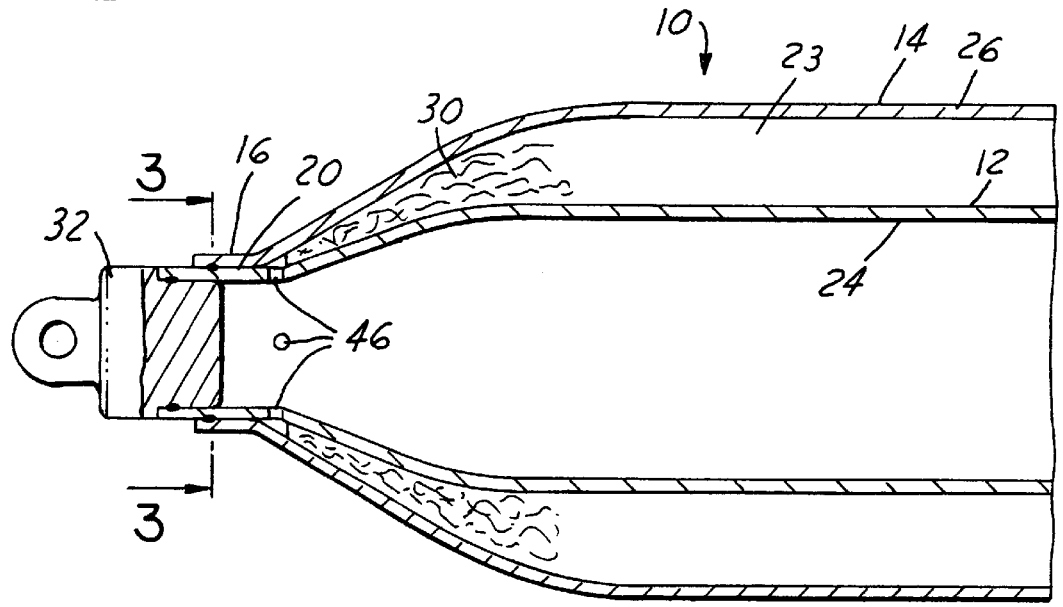
FIG. 2 is a fragmentary sectional view taken on the line 2—2 in FIG. 1.
Figure 3:
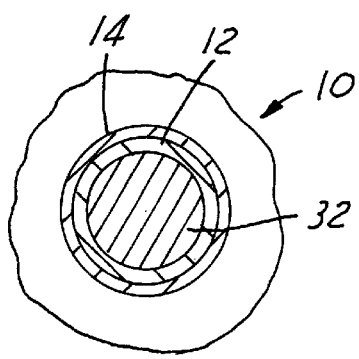
FIG. 3 is a sectional view taken on the line 3—3 in FIG. 2.

Referring now more particularly to the drawings, and especially FIGS. 1–3, there is shown a driveshaft 10 having an elongated inner tube 12 extending coaxially within an elongated outer tube 14. The tubes are preferably made of steel or aluminum. The ends 16 of the outer tube 14 are sleeved over and surround the ends 20 of the inner tube 12. An annular space or chamber 23 is defined between the elongated, cylindrical central portion 24 of the inner tube and the elongated, cylindrical central portion 26 of the outer tube. A noise and vibration dampening material 30 is injected into the chamber 23. The dampening material may be made of rubber for example, or other suitable material, but a lightweight foam is recommended, preferably polystyrene foam. The dampening material fills the chamber 23 and may be introduced into the chamber in liquid form and allowed to foam and set.

The dampening material 30 adds considerable strength to the driveshaft 10 and suppresses noise and vibration even at high speeds of driveshaft rotation. The overall construction also suppresses the tendency of the driveshaft to whip at high speeds.

The ends 16 and 20 of the tubes 12 and 14 of the driveshaft 10 are of smaller diameter than the central portions thereof and are swaged and secured together as by welding, preferably by magnetic pulse welding, throughout a full 360°. The driveshaft is intended to be secured to yokes 32 and 34 at the two ends. As shown, the yokes extend into the ends of the inner tube 12 and are welded to the inner tube as by magnetic pulse welding. The welding of the tube ends together and of the inner tube to the yokes may, if desired, be carried out in a single welding operation.

Figure 8:
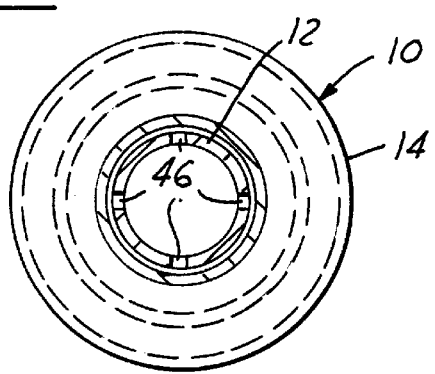
FIG. 8 is a sectional view taken on the line 8—8 in FIG. 7.

The driveshaft 10 is preferably made by a process of hydroforming. Referring to FIGS. 4 and 8, an elongated inner tubular member 40 is placed coaxially within an elongated outer tubular member 42 to provide a tube-in-tube assembly 44 in which the ends of the tubes are sleeved over one another. The inner tubular member 40 has holes 46 near each end for a purpose which will become apparent later in this description. The tubular members 40 and 42 are initially of uniform diameter throughout their lengths. When hydroformed according to the method of this invention, the tubular members 40 and 42 become the inner and outer tubes 12 and 14 of the driveshaft.

Referring to FIGS. 4 and 5, a mold 50 is employed in a first step in the hydroforming of the driveshaft. The mold 50 includes of upper and lower mold parts 52 and 54. The mold parts 52 and 54 have matching, confronting recesses 56 and 58 which, when the mold parts are closed, define an elongated cavity 60. The cavity 60 has an elongated cylindrical central portion 62 of a diameter and contour somewhat smaller than the diameter and contour of the central portion of the outer tube 14 of the driveshaft to be formed, and end portions 64 and 66 of a diameter less than the diameter of the central portion 62 of the cavity.

In this initial step in the method, and with the upper mold part 52 spaced above the lower mold part 54, the assembled tube-in-tube assembly 44 is placed lengthwise within the recess 58 in the lower mold part 54. The upper mold part 52 is then lowered and closed against the lower mold part 54 to form the cavity 60 and confine the tube-in-tube assembly therein. Hydraulic fluid is introduced under pressure into both ends of the tube-in-tube assembly in the space within the inner tubular member 40 through tubular pressure fittings 68 to expand both tubular members 40 and 42 into the shape of the mold cavity as shown in FIGS. 4 and 5. The fittings 68 extend into opposite ends of the inner tubular member 40 and have flanges 69 at the inner ends thereof which seal against the inner wall of the inner tubular member at points axially inwardly beyond the holes 46. In the expanded condition of the tubular members 40 and 42, the central portion of the outer tubular member contacts and presses against the central portion 62 of the mold cavity. In this initial step, the inner tubular member 40 has been expanded to the final shape and configuration of the inner tube 12 of the driveshaft, but the outer tubular member 42, while somewhat expanded, is still not fully expanded to the final shape of the outer tube 14.

Figure 6:
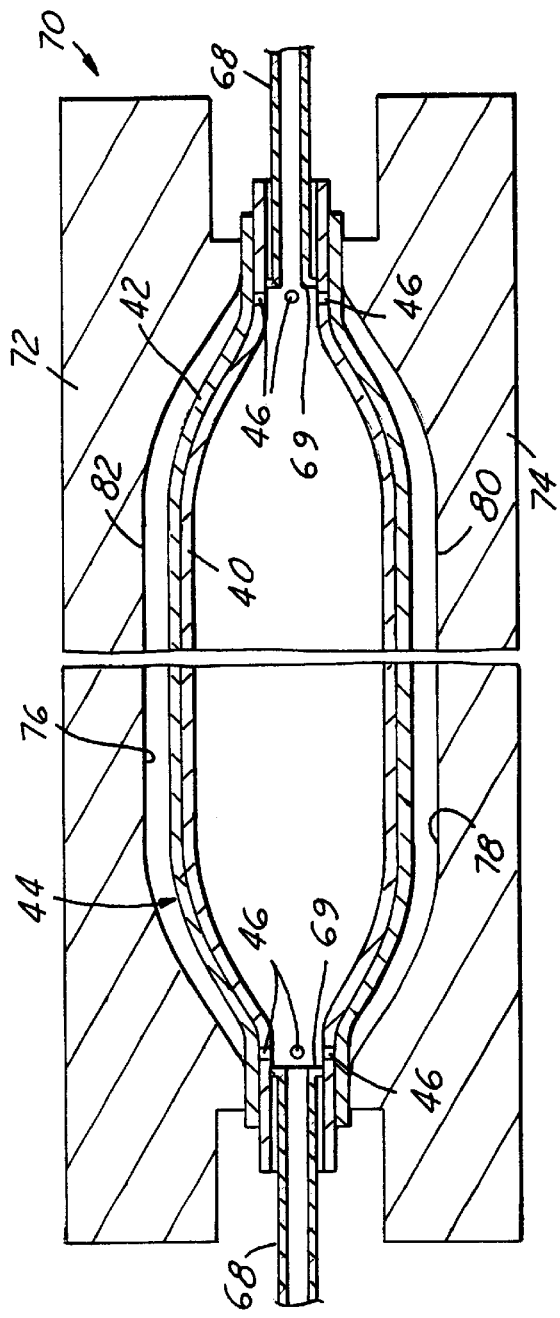
FIG. 6 is a longitudinal sectional view, with parts broken away, of the partially formed tube-in-tube assembly in a second mold for final shaping.
Figure 7:
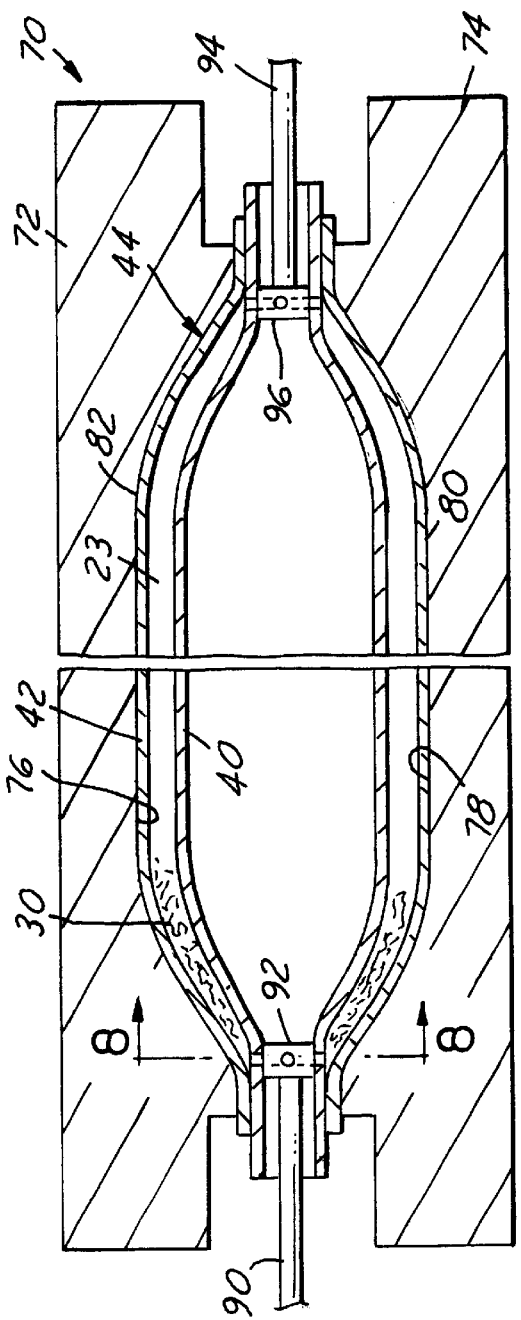
FIG. 7 is a view of the tube-in-tube assembly after final shaping showing the introduction of foam between the two tubes.

Referring to FIGS. 6–8, a mold 70 is provided for use in a second step of the method. The mold 70 includes upper and lower mold parts 72 and 74. The mold parts 72 and 74 have matching, confronting recesses 76 and 78 which, when the mold parts are closed, define an elongated mold cavity 80. The mold cavity 80 has an elongated, cylindrical central portion 82 of a diameter and contour equal to that of the central portion 26 of the outer tube 14 of the driveshaft to be formed.

The partially formed tube-in-tube assembly 44 is taken from the mold 50 and placed lengthwise within the recess 78 in the lower mold part 74. The upper mold part 72 is then lowered and closed against the lower mold part 74 to form the cavity 80 and confine the tube-in-tube assembly 44 therein. Hydraulic fluid is introduced under pressure into both ends of the tube-in-tube assembly in the space within the inner tubular member 40 through pressure fittings 68. The pressure fittings 68 extend into the opposite ends of the inner tubular member a lesser distance than in the initial step of FIGS. 4 and 5 to expose the holes 46 in the inner tubular member. The pressure of the hydraulic fluid is applied equally to the space inside the inner tubular member 40 and, through holes 46, to the space between the tubular members 40 and 42. This same pressure inside and outside the inner tubular member 40 causes the inner tubular member to retain the configuration developed in the first step of the method, but the outer tubular member 42 is forced radially outwardly to a further expanded condition in pressure contact with the wall of the central portion 82 of the mold cavity 80. In this condition of the tube-in-tube assembly 44, both the inner and outer members 40 and 42 have been formed to the final desired configuration of the driveshaft.

The dampening material 30 may be introduced into the chamber 23 between the central portions of the two tubes while the tube assembly is still in the mold 70 or after the tube assembly is removed from the mold 70. The dampening material is preferably polystyrene foam and may be introduced in liquid form through a tubular injection fitting 90. The fitting 90 is inserted into one end of the inner tube 40 far enough so that its head 92 registers with the holes 46 in that same end of the inner tube. A fitting 94, like fitting 90, is inserted into the opposite end of the inner tube with its head 96 registering with the holes 46 in the opposite end of the inner tube to relieve air and excess dampening material from the chamber 23.

Either before or after the introduction of the dampening material into the chamber 23, the ends of the tubes are swaged and welded together and also welded to the end yokes 32 and 34.

The formation of the driveshaft 10 is now complete. The tube-in-tube construction of the driveshaft with dampening material in the space between the tubes 12 and 14 dampens vibration and the tendency to whip, and also suppresses noise.

What is claimed is:

1. A driveshaft comprising:

an outer tube, an inner tube extending co-axially within said outer tube, means securing said tubes to one another, and vibration dampening material between said inner and outer tubes wherein said vibration dampening material comprises foam.

2. The driveshaft of claim 1, wherein said outer tube has first and second end portions, said inner tube has first and second end portions, the first end portion of the outer tube is sleeved over the first end portion of the inner tube, the second end portion of the outer tube is sleeved over the second end portion of the inner tube, and said securing means secures the first end portions together and the second end portions together.

3. The driveshaft of claim 1, wherein said tubes each have a central portion between the end portions thereof, said inner and outer tubes are made of metal and define an annular chamber between said central portions, and said foam material fills said chamber.

4. The driveshaft of claim 3, wherein said outer tube has first and second end portions, said inner tube has first and second end portions, the first end portion of the outer tube is sleeved over the first end portion of the inner tube, the second end portion of the outer tube is sleeved over the second end portion of the inner tube, and said securing means secures the first end portions together by welding and the second end portions together by welding.

5. A driveshaft comprising;

an outer tube, an inner tube extending co-axially within said outer tube, means securing said tubes to one another, vibration dampening material between said inner and outer tubes wherein said vibration dampening material comprises foam, and wherein said tubes each have a central portion between the end portions thereof, said inner and outer tubes are made of metal and define an annular chamber between said central portions, and said foam material fills said chamber.

6. The driveshaft of claim 5, wherein said outer tube has first and second end portions, said inner tube has first and second end portions, the first end portion of the outer tube is sleeved over the first end portion of the inner tube, the second end portion of the outer tube is sleeved over the second end portion of the inner tube, and said securing means secures the first end portions together by welding and the second end portions together by welding.

* * * * *